United States Patent [19]

Levy et al.

[11] Patent Number: 4,976,035
[45] Date of Patent: Dec. 11, 1990

[54] METHOD AND APPARATUS FOR CONTOURING DATA PARTICULARLY USEFUL IN PREPARING TOPOGRAPHIC MAPS

[75] Inventors: Nessim I. Levy, Savyon; Nira Dyn, Hod Hasharon; Samuel Rippa, Ramat Chen, all of Israel

[73] Assignee: "XI" Information Processing Systems Ltd., Savyon, Israel

[21] Appl. No.: 373,139

[22] Filed: Jun. 29, 1989

[30] Foreign Application Priority Data

Jun. 30, 1988 [IL] Israel .................................... 86938

[51] Int. Cl.$^5$ .......................................... G01B 3/14
[52] U.S. Cl. .................................. 33/1 A; 364/474.31
[58] Field of Search ........... 33/1 A, 1 MP, 1 M, 20.1, 33/20.2, 20.4; 364/474.28, 474.31, 474.36, 474.37

[56] References Cited

U.S. PATENT DOCUMENTS

| | | | |
|---|---|---|---|
| 2,753,756 | 7/1956 | Santoni | 33/1 A |
| 2,811,445 | 10/1957 | Mahan et al. | 33/1 A |
| 3,989,933 | 11/1976 | Inghilleri | 33/1 A |
| 4,491,906 | 1/1985 | Kishi et al. | 364/474.31 |
| 4,528,632 | 7/1985 | Nio et al. | 364/474.31 |
| 4,581,698 | 4/1986 | Jaswa | 364/474.31 |
| 4,709,482 | 12/1987 | Matsucika et al. | 33/1 M |

*Primary Examiner*—William A. Cuchlinski, Jr.
*Assistant Examiner*—D. Price
*Attorney, Agent, or Firm*—Benjamin J. Barish

[57] ABSTRACT

Method and apparatus are described for determining the contour lines for gridded data defining a four-sided cell composed of two grid lines along the X-axis and two grid lines along the Y-axis, involves the steps of sorting four data points according to their values along a selected one of the two grid axes; connecting the point of minimum value along the selected grid axis to the point of second minimum value along the selected grid axis; and connecting the point of third maximum value along the selected grid axis to the point of maximum value along the selected grid axis. In the described embodiment, the contour lines represent common elevation points in a topographic map.

10 Claims, 6 Drawing Sheets

BI-LINEAR INTERPOLATION

FIG 10α

| | | |
|---|---|---|
| Pt.1 (M=1) | $dy1 = Dy \cdot \dfrac{H-Z_{i,y}}{Z_{i+1,y}-Z_{i,y}}$ ; $d_{x1} = 0$ | |
| Pt.2 (M=2) | $dx2 = Dx \cdot \dfrac{H-Z_{i+1,y}}{Z_{i+1,y+1}-Z_{i+1,y}}$ ; $d_{y2} = Dy$ | |
| Pt.3 (M=3) | $dx3 = Dx \cdot \dfrac{H-Z_{i,y}}{Z_{i,y+1}-Z_{i,y}}$ ; $dy_3 = 0$ | |
| Pt.4 (M=4) | $dy4 = Dx \cdot \dfrac{H-Z_{i,y+1}}{Z_{i+1,y+1}-Z_{i,y+1}}$ ; $d_{x4} = Dx$ | |

METHOD AND APPARATUS FOR CONTOURING DATA PARTICULARLY USEFUL IN PREPARING TOPOGRAPHIC MAPS

BACKGROUND OF THE INVENTION

The present invention relates to a method and apparatus for contouring gridded data. The invention is particularly useful in preparing topographical maps, and is therefore described below with respect to this application.

Contour lines are lines of a common or equal value along the Z-axis of a three-dimensional object, and are commonly used to describe graphically the surface of the three-dimensional object. Contour maps are thus two dimensional representations of three dimensional surfaces of the form $Z=f(x,y)$. Various algorithms exist for computing contour maps, many of which are summarized in the survey papers of Sutcliffe, D.C., *Contouring Over Rectangular and Skewed Rectangular Grids—An Introduction*, in Mathematical Methods in Computer Graphics and Design, K. Brodlie (ed.), Academic Press, New York, 1980, 39–62; and Sabin, M.D., *A Survey of Contouring Methods*, Computer Graphics Forum 5 (1986), 325–340. The most common example of a contour map is a topographic map, wherein a contour line of elevation "H" is the line connecting all points on the surface whose elevation (long the Z-axis) is equal to "H".

There are a number of known methods to create contour lines. One method involves direct measurement, e.g., using stereo-aerial photographic techniques, in which elevations are measured, and the contour of lines are drawn through direct and continuous measurements by a human operator. Another method is through ground survey measuring points, this method involving interpolation between the sample points to define the contour line of any specified elevation.

A third known technique involves measurement of the elevation of the surface, e.g., by stereo pair aerial photography, at regular spacings along the X and Y-axes, resulting in a set of points on a grid of equal sides each of which has a measured elevation along the Z-axis. The contour lines are then generated from these elevation points by interpolating the measured values to the required contour line value. For example, if the preselected elevation H (value along the Z-axis) is 10.0 meters, the contour lines will connect all points on the grid lines having an elevation of 10.0 meters.

The present invention is concerned with the technique of the third type described above for contouring gridded data. The third technique for generating contour lines is generally more efficient than either of the above-described first or second techniques, but involves solving a problem, sometimes called the "degenerate cell", arising as follows:

THE DEGENERATE CELL PROBLEM

When a two-dimensional contour map is used for representing a three-dimensional surface in the form $Z=f(x,y)$, it is assumed that "f" is known only at the nodes of a regular grid located over the rectangular domain $R=[a,b]\times[c,d]$. The input for the contouring scheme is a data matrix $Z=\{z_{ij}\}$ such that:

$$z_{ij}=f(X_i, Y_j), i=1,\ldots,n, j=1,\ldots,m \quad (1)$$

where $$X_i = a+\delta_x(i-1), \delta_x=(b-a)/(n-1)$$

$$Y_j=c+\delta_y(j-1), \delta_y=(d-c)/(m-1)$$

Each sub-rectangle $R_{ij}=[X_i,X_i+1]\times[Y_j,Y_j+1]$ of the grid is called a grid cell.

This process of contouring gridded data includes two basic steps:

1. Find all intersections of the contour h [i.e., the contour defined by the equation $f(x,y)=h$] with edges of the cells of the grid. Intersection between the contour h and an edge of a grid cell (with end points A and B) occur when $$\min(f(A),f(B)) \leq h \leq \max(f(A),f(B))$$

The usual assumption (see e.g., Sutcliffe [supra]) is that $\delta_x$ and $\delta_y$ are sufficiently small so that f behaves linearly on all edges of each grid cell. This means that no contour h crosses any edge of a grid cell more than once and that the actual intersection point may be approximated using inverse linear interpolation between points A and B.

2. Trace the intersection points through the grid cells and link them together to form contour lines.

When implementing a contouring algorithm by the above approach one soon discovers two types of ambiguous situations.

The first involves a "degenerate point" which is a point $(x_i,y_j)$ for which $z_{ij}=h$. This type of degeneracy is easily handled, e.g., by "virtually" changing $z_{ij}$ by a small amount when processing Step 1 above. This virtual change also avoids the occurrence of a degenerate edge—an edge connecting two degenerate points.

The second ambiguous situation involves a "degenerate cell" which occurs when four interections are recorded on the boundaries of one grid cell (FIG. 1). This type of cell is called degenerate since, because of lack of information, there seems to be three possible ways for connecting the intersection points to form the contour lines, as shown in FIGS. 2a, 2b and 2c, respectively.

Any scheme for connecting the intersection points in a degenerate cell may be referred to as a solution to the cell degeneracy problem (SCDP). A SCDP is called stable if the shape of the connected contour lines changes only slightly when altering the values $z_{ij}$ at the corners of the cell by a small amount. Clearly stability is a desired property of any SCDP. As far as we know this important feature has never been discussed before as a measure for the quality of a contouring method.

Many suggestions for SCDPs are summarized in Sutcliffe (supra). Most of them address the problem in the second step of the contouring algorithm. Starting with an entry point to the degenerate cell, the goal is to find the exit point. One solution uses a table from which the exit edge is selected according to the entry edge. Another solution uses the principle "keep the high ground on the right"; the edges are scanned in the order—right, top left (relative to the starting edge)—until a suitable exit point is found. Another possibility is to choose the exit point so that the change in direction from the previous step will be minimal.

All these solutions share one thing in common: they are unstable. To see the instablility consider the example in FIG. 3 in which a contour line h=0 is traced and ε is a small positive number. Suppose that the starting edge was the bottom edge. The high ground to the right principle will connect the solid points with the circled points and so will do the tabular solution. Let us assume that the lower-left value of $\epsilon$, and the lower-right corner has a value of 10. In this case, the minimal change principle also connects the solid and the circled points since it results in zero change in direction. By changing the value on the top-right corner of the cell in FIG. 3 from $-\epsilon$ to $-\epsilon$ we eliminate the degeneracy of the cell. The two remaining (solid) intersection points are then connected to each other, indicating the instability of all SCDPs, presented above (a small change in the value of the top-right corner changed completely the shape of the contour lines).

Another SDCP (Yoeli, P., Cartographic contouring with computer and plotter The American Cargographer 11 (1984), 139–155) connects the intersection points so that the resulting contour lines separate the higher ground points. This solution is also unstable as can be verified in the above example.

OBJECTS AND SUMMARY OF THE PRESENT INVENTION

An object of the present invention is to provide a method and apparatus for contouring gridded data producing a stable solution to the above-described "degenerate cell" problem.

According to the present invention, there is provided a method of determining the contour lines for gridded data defining a four-sided cell composed of two grid lines along the X-axis and two grid lines along the Y-axis, wherein there are two contour lines represented by four data points, one on each of the four grid lines, comprising: sorting the four data points according to their values along a selected one of the two grid axes; connecting the point of minimum value along the selected grid axis to the point of second minimum value along the selected grid axis; and connecting the point of third minimum value along the selected grid axis to the point of maximum value along the selected grid axis.

As will be shown by the Mathematical Discussion below, such a method produces a stable solution to the above-described "cell degeneracy problem".

More particularly, the invention provides a method of determining the contour lines of a three-dimensional surface defined by X-axis, Y-axis and Z-axis coordinates, which contour lines represent a preselected value of the three-dimensional surface along the Z-axis, comprising: measuring, at regular spacing intervals along the X-axis and Y-axis, the value of the three-dimensional surface along the Z-axis to produce a set of measured points on a grid defining a plurality of four-sides cells each composed of two grid lines along the X-axis and two grid lines along the Y-axis; interpolating, for each four-sided cell, the measured values of the points along the Z-axis to determine the positions on the grid lines of the respective cell of the interpolated points representing the preselected Z-axis value; where the cell does not include one such interpolated point on each of the four grid lines, generating contour lines by connecting together the interpolated points; and where the cell includes one such interpolated point on each of the four grid lines, generating contour lines connecting the four interpolated points by sorting the four points according to their values along a selected one of the two grid axes, connecting the point of minimum value along the selected grid axis to the point of second minimum value along the selected grid axis, and connecting the point of third minimum value along the selected grid axis to the point of maximum value along the selected grid axis.

The method is particularly applicable in preparing topographic maps, wherein the contour lines represent common elevation points in the topographic map.

The invention also provides apparatus for contouring gridded data in accordance with the above method, and particularly apparatus useful in preparing topographic maps.

BRIEF DESCRIPTION OF THE DRAWINGS

The invention is herein described, by way of example only, with reference to the accompanying drawings, wherein:

FIGS. 10 and 10a, taken together, constitute a flow diagram illustrating the process for performing the bilinear interpolation step in the flow diagram of FIG. 9b.

MATHEMATICAL DISCUSSION

Figure 1:
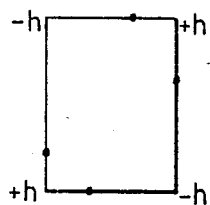
FIGS. 1–7c are diagrams helpful in explaining the above-described "degenerate cell" problem, of which FIGS. 1–3 were referred to in the preceding description, and FIGS. 4–7c will be referred to in a subsequent description of this problem.

The present invention uses a piecewise bilinear model in the degenerate cells. This model provides a natural and stable solution to cell degeneracy, resulting in a very simple scheme which compares favorably to other solutions. In the above example of FIG. 3 the solution with the bilinear model connects the solid points to each other and the circled points to each other (i.e., the solution of FIG. 2a).

A bilinear model for the surface in a degenerate cell $R_{ij}$ with lower-left corner $(X_i, Y_j)$ is:

$$P_{ij} = a_{ij} + b_{ij}\frac{(x - x_i)}{\delta x} + c_{ij}\frac{(y - y_i)}{\delta y} + d_{ij}\frac{(x - x_i)(y - y_i)}{\delta x \delta y}, \; (x,y) \in R_{ij} \quad (2)$$

The interpolation conditions at the four corners of $R_{ij}$:

$$P_{ij}(X_r, Y_s) = Z_{rs}, r = i, i+1, S = j, j+1 \quad (3)$$

uniquely determine $P_{ij}$. The coefficients of $P_{ij}$ are:

$$a_{ij} = f_{ij}$$

$$b_{ij} = f_{i+1,j} - f_{ij}$$

$$c_{ij} = f_{i,j+1} - f_{ij}$$

$$d_{ij} = f_{i+1,j+1} - f_{i+1,j} - f_{i,j+1} + f_{ij} \quad (4)$$

Using this model, the problem of contouring within a degenerate cell can be replaced by the problem of calculating exactly the contour curves of $P_{ij}$. This approach provides a stable solution for cell degeneracy since $P_{ij}$ is a continuous function and thus, small perturbations of the values at the four corners change the locations of the contour curves of $P_{ij}$ only slightly.

To trace the contours of $P_{ij}$, we observe that $P_{ij}$ is linear on each edge of the degenerate cell and thus no more than one intersection point exists between a contour and such an edge. Moreover, the intersection point can be calculated exactly using inverse linear interpolation. We note, also, that $P_{ij}$ is linear on each horizontal or vertical line inside the cell. Thus there can be at most one intersection point between the contours of height h and any horizontal or vertical line inside a degenerate grid cell (except when the vertical or horizontal line is a segment of the contour line). This observation provides the rule for connecting the intersection points within a degenerate cell.

The rule for connecting the intersection points within a degenerate cell, in order to provide a stable solution, is as follows: sort the four points along the four side lines of the cell according to their values along a selected one of the two axes; connect the point of minimum value along the selected axis to the point of second minimum value along the selected axis, and connect the point of third minimum value along the selected axis to the point of maximum value along the selected axis.

It makes no difference whether the X-axis or the Y-axis is selected for sorting the four points. If the four points are selected according to their X value, the two points of minimum X value are connected together to form one line, and the remaining two points are connected together to form the second line. In either case, the result will be the stable solution illustrated in FIG. 2a.

Figure 6A:
Figure 6B:
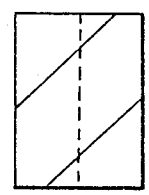

Note that the critera above are equivalent only if the intersection points are computed by inverse linear interpolation. In any other case it might happen that the two criterions result in different connections of the intersection points as demonstrated in FIG. 6. In this case the two connecting lines are intersected either by a horizontal or by a vertical line (e.g., the dashed lines in FIG. 6).

Figure 7A:
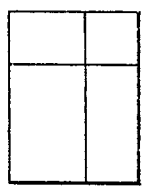
Figure 7B:
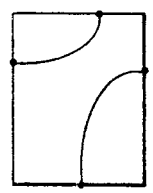
Figure 7C:

The above SCDP does not lead to a unique choice of alternatives only in the very special case where the left and right intersection points have the same y coordinate (consequently the top and bottom intersection points must have the same x coordinate) as is illustrated in FIG. 7. The only correct way to connect the intersection points, according to the bilinear model is as in FIG. 7a (think about the contour h=0 of the function z=xy). This type of connection is unpleasant to the eye and represents an ideal mathematical model. To avoid such situations we suggest to use the same treatment as in the case of point degeneracy, i.e., to alter "virtually" the values of the data at one corner of the cell so that the different contour branches will not cross. To retain the stability of the solution one should not connect the intersection points by straight line segments as in FIG. 7c but rather follow the contour lines of $P_{ij}$ as in FIG. 7b. To do so consider the grid cell $R_{ij}$ and define $t=(x-X_i)/\delta_x, S=(y-Y_j)\delta_y$. Equation (2) can be rewritten as:

$$P_{ij}=P_{ij}(t,s)=a_{ij}+b_{ij}t+C_{ij}s+d_{ij}ts, s,t\epsilon(0,1) \quad (5)$$

The implicit formula for the curve of the contour h is given by:

$$h=P_{ij}(t,s) \quad (6)$$

Denote by $(t_o,s_o)$ and $(t_n,s_n)$ two intersection points of the contour h with the cell's edges, e.g., $P_{ij}(t_o,s_o)=P_{ij}(t_n,s_n)=h$. Suppose furthermore that these points are to be connected, by the bilinear model, to form a contour line. We can distinguish between two cases:

(a) $|t_n-t_o| \geq |s_n-s_o-|$. In that case we can use (2) and (3) to write s as a function of t:

$$s = s(t) = \frac{h - a_{ij} - b_{ij}t}{C_{ij} + d_{ij}t} \quad (7)$$

and evaluate the function s(t) at the points:

$$t_1 = t_o + \frac{t_n - t_o}{n} i, i = 1, \ldots n - 1 \quad (8)$$

Then we obtain the contour line by connecting the points $(t_i,s(t_i)), i=0, \ldots, n$ with line segments. This curve is much smoother (depending on how large is n) than the line segment connecting $(t_o,s_o)$ and $(t_n,s_n)$.

(b) $|t_n-t_o| < |s_n-s_o|$. In that case we can use (2) and (3) to write t as a function of s:

$$t = t(s) = \frac{h - a_{ij} - C_{ij}\delta}{b_{ij} + d_{ij}\delta} \quad (9)$$

and attain the contour line as above, with the roles of t and s interchanged.

It should be remarked that equations (7) and (8) can be used to obtain smooth contour lines within each grid cell.

Before concluding we mention the method of Heap for the solution of cell degeneracies and point out its close relation to the method proposed in this paper. Heap divides each grid cell into four triangles by the diagonals, taking the value at the center to be the mean of the four values at the corners of the cell. This approach gives a stable solution to degenerate cells (a property not observed up to now) and, also, smooth the contour lines since in each cell a contour curve is composed of two linear pieces instead of one (see Sutcliffe [supra]) and Sabin [supra] where this method is called "St. Andrew's cell").

Observing that the value of $P_{ij}$ at the center of the cell $R_{ij}$ is the average of the values at the four corners of $R_{ij}$, we conclude that Heap's method is based on a piecewise linear approximation on triangles to the bilinear model $P_{ij}$. Thus the method of the present invention is an improvement over Heap's method yielding smoother contour lines.

DESCRIPTION OF A PREFERRED EMBODIMENT

Figure 8:
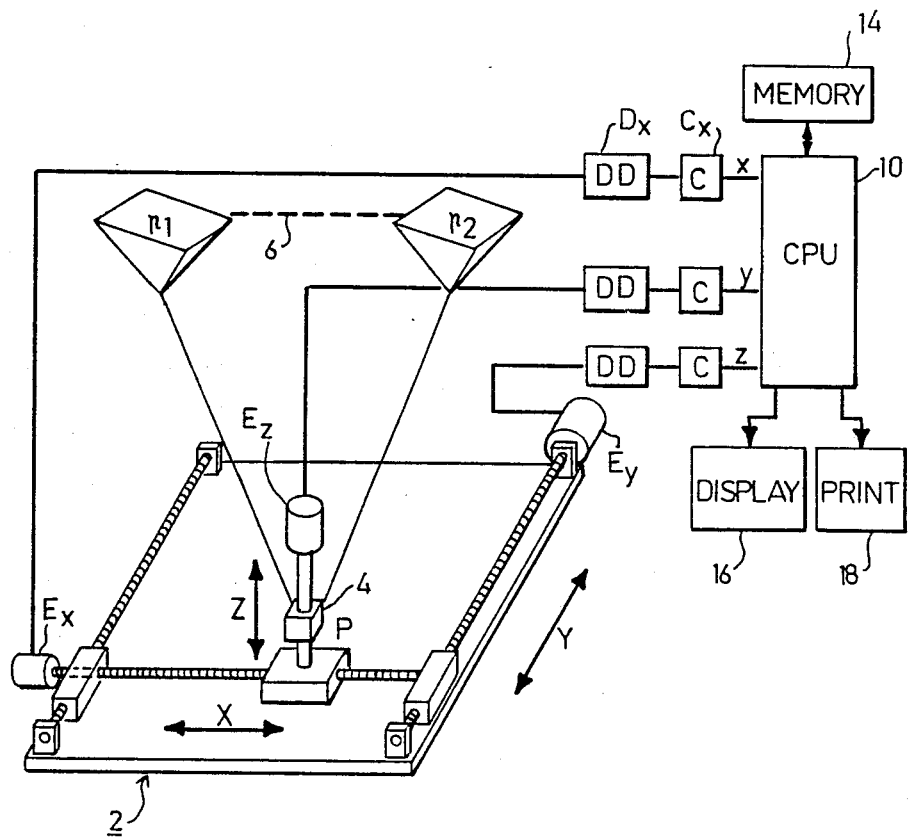
FIG. 8 illustrates one form of apparatus constructed in accordance with the present invention.

FIG. 8 illustrates one form of apparatus constructed in accordance with the invention and operating according to the flow diagram of FIGS. 9a, 9b, 10 and 11. The apparatus illustrated in FIG. 8 is a conventional analog stereo-plotter with electronic XYZ-coordinate digital readout, for preparing a topographic map having contour lines representing connected points of common elevation.

The apparatus illustrated in FIG. 8 comprises a plotter, generally designated 2, having a probe 4 movable along the X-axis, Y-axis and Z-axis, with respect to an irregular surface, generally designated 6, being plotted. Probe 4 is coupled to three shaft encoders $E_X$, $E_Y$, and $E_Z$, which convert to electrical signals the movements of the probe along each of the three axes. The shaft encoders, which may of a known construction, produce digital signals corresponding to the movement of the probe along each of the three axes.

The apparatus illustrated in FIG. 8 futher includes three direction discriminators, $D_X$, $D_Y$, $D_Z$, one for each of the three axes and connected to receive the digital signals from the respective encoder $E_X$, $E_Y$, $E_Z$, for determining the direction of movement of the probe along the respective axis. Three up/down counters $C_X$, $C_Y$, $C_Z$, one for each axis, are provided for registering the values of the movement of the probe along its respective axis. The values registered in these counters thus represent the three coordinates, $X_{ij}$, $Y_{ij}$ and $Z_{ij}$ of the instantaneous position of the probe 4. These coordinate values are read into the CPU (central processor unit) 10 of a computer, which computer also includes a keyboard 12 (FIG. 9a) for manually inputting information therein, a memory 14 (FIG. 8) for storing data, a display 16, and a printer 18 for displaying and printing, respectively, inputted as well as processed data.

Figure 9A:
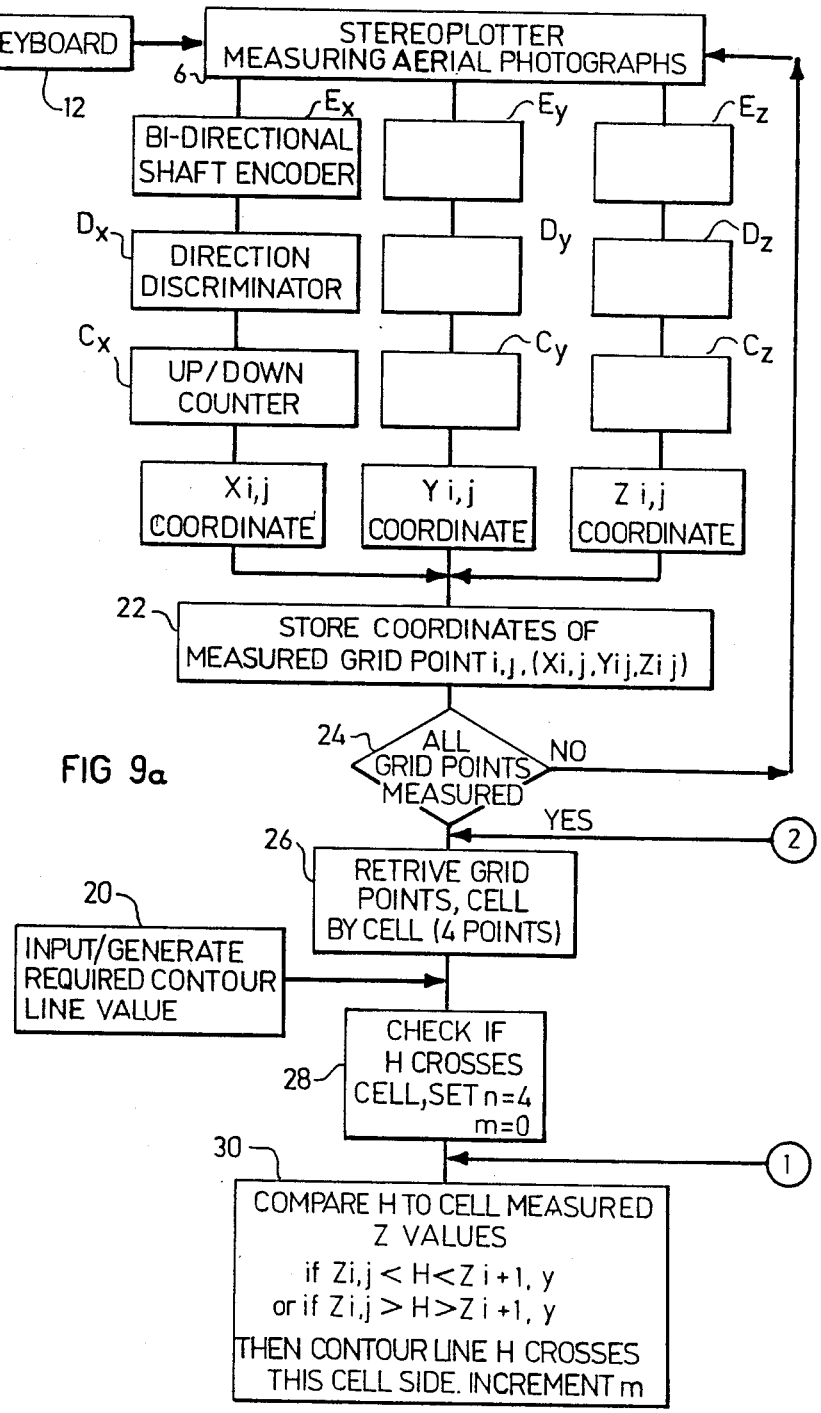
FIGS. 9a and 9b, taken together, constitute a flow diagram illustrating the operation of the apparatus of FIG. 8.
Figure 9B:
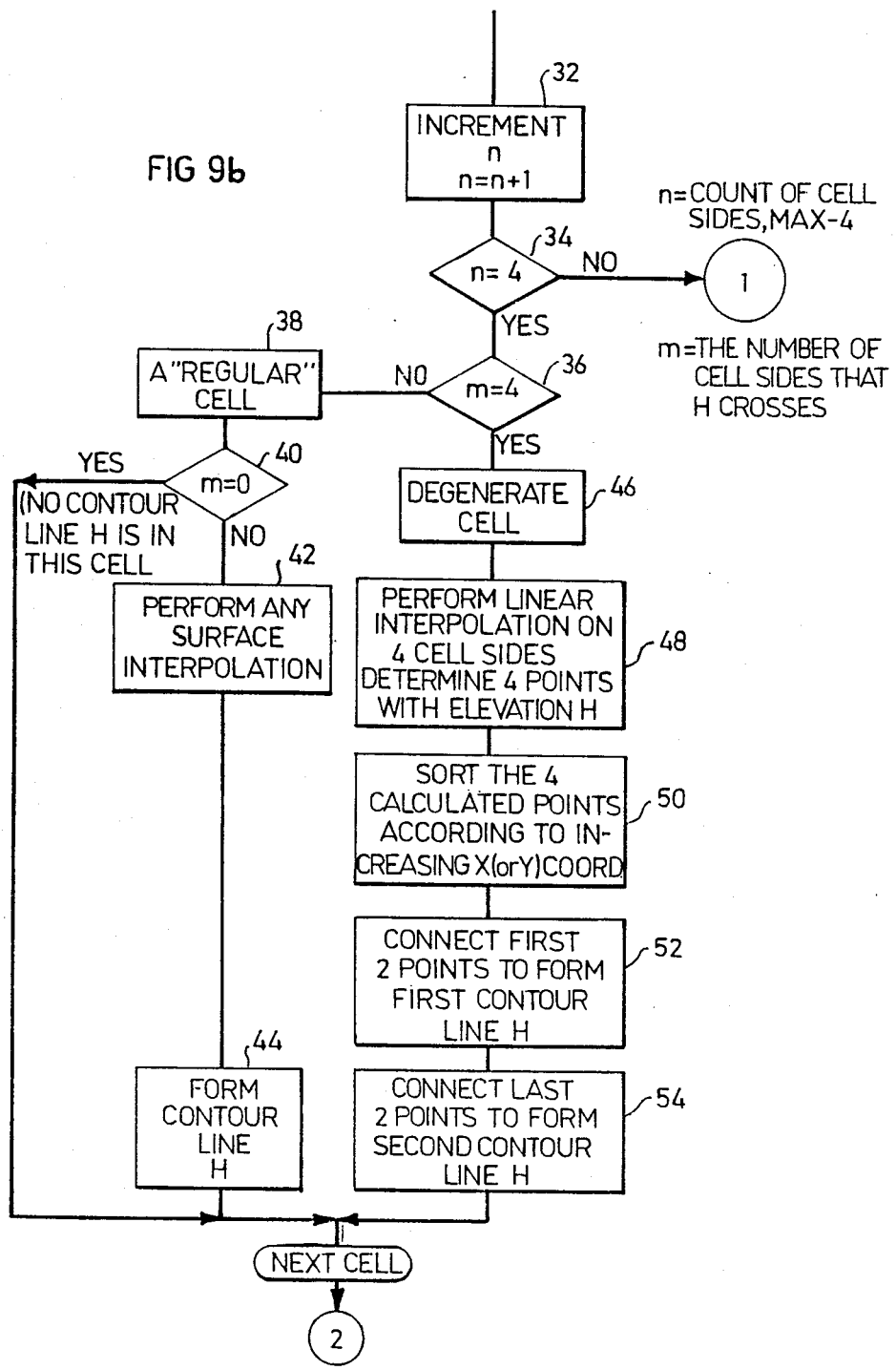
Figure 10:
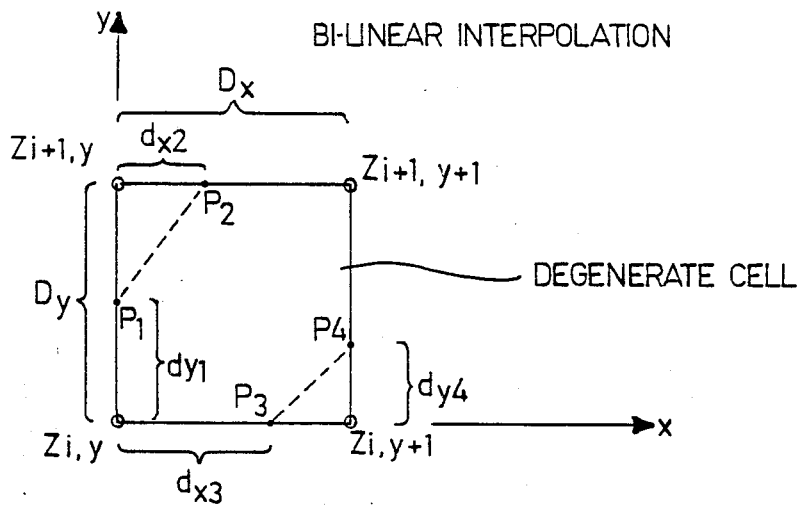
Figure 11:
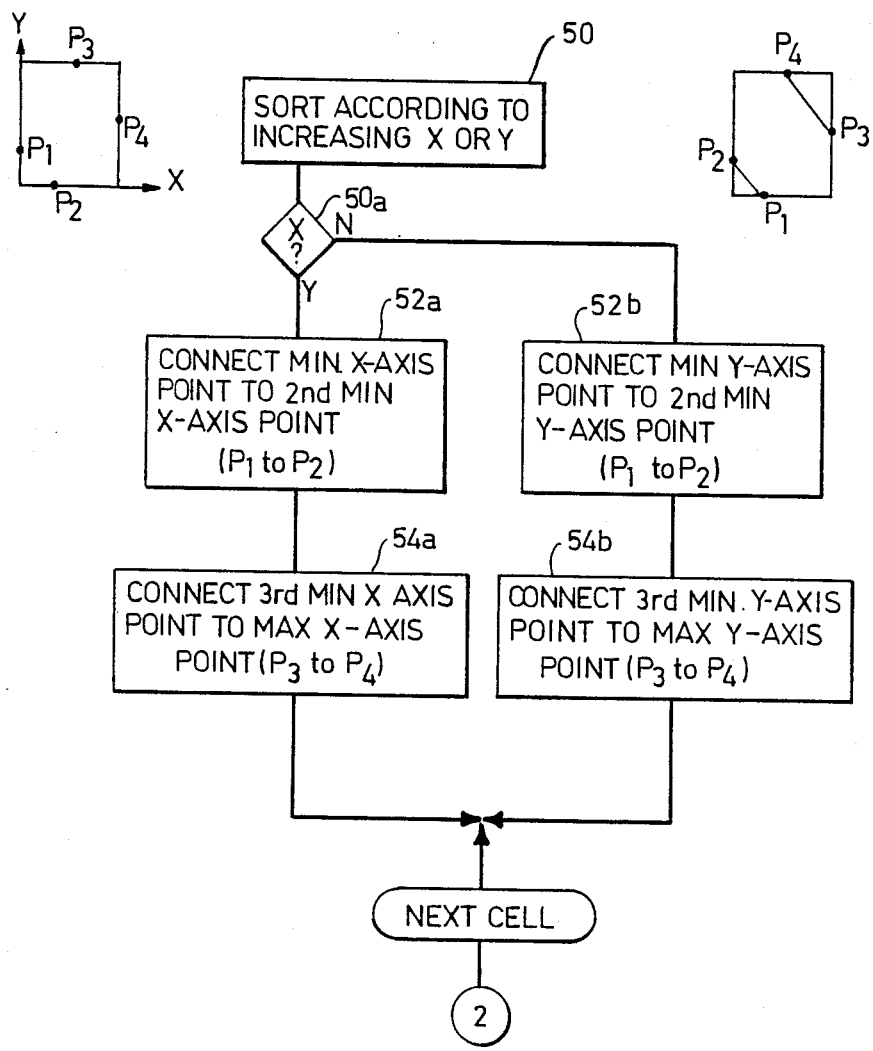
FIG. 11 is a flow diagram illustrating the process in the flow diagram of FIGS. 9a and 9b for solving the above-described "degenerate cell" problem.

The flow diagram of FIGS. 9a and 9b illustrates the overall operation of the apparatus of FIG. 8, in which the elevations of the surface is measured at regular spacing points along the X-axis and Y-axis, resulting in a set of points on a grid of four equal sides, having known (measured) elevations (Z-values). FIG. 10 illustrates the bilinear interpolation process for interpolating the measured values to the required contour-line values; and FIG. 11 illustrates the process of generating the contour lines of common elevations to provide a stable solution for connecting the interpolated points in the ambiguous case of a degenerate cell as described above.

For example, it will be assumed that it is desired to generate contour lines representing the common elevation of 10.00 meters, this being the value "H" which is inputted into the apparatus as shown by block 20 in FIG. 9a.

The operator moves probe 4 at regular spacings along the X-axis and Y-axis and measures the elevation (H) at regular spaced intervals along these axes, producing a set of points on a grid to define cells having four equal sides, as illustrated in FIG. 1. The movements of the probe 4 along the X-axis and along the Y-axis to define the cells of equal sides are converted to electrical signals by the X-axis encoder $E_X$ and the Y-axis encoder $E_Y$, whereas the movement of the probe along the Z-axis in accordance with the measured elevation H is converted to electrical signals by the Z-axis encoder $E_Z$. The electrical signals produced by the three encoders $E_X$, $E_Y$ and $E_Z$ are digital signals and are fed to their respective direction discriminators $D_X$, $D_Y$, $D_Z$ and their respective up/down counters $C_X$, $C_Y$, $C_Z$, so that the values in these counters represent the X-coordinate, Y-coordinate and Z-coordinate of the instantaneous position of the probe.

These coordinate positions are stored in the memory 14 as the measured grid points i, j ($X_{ij}$, $Y_{ij}$, $Z_{ij}$) as shown by block 22 in the flow diagram of FIG. 9a.

The foregoing measurement process is repeated until all the grid points are measured, as shown by block 24 in FIG. 9a. When all the grid points have thus been measured, the grid points are retrieved, cell by cell, and are temporarily stored, as shown by block 26.

The common elevation H (e.g., 10.00 meters in the example described herein) for the contour lines to be drawn, is inputted (e.g., by the keyboard 12) as indicated by block 20 in FIG. 9a.

The computer then checks to see whether the inputted value H (e.g., 10.00 meters) crosses any of the four cell sides. Thus, as shown by block 28, the computer sets the number of cell sides (n) to be equal to four and counts the number (m) of cell sides containing the specified H value, as shown by blocks 30, 32 and 34 in the flow diagram of FIGS. 9a and 9b. If the number (m) of cell sides crossed by H is other than "4", as checked by block 36, then the cell is determined to be a "regular" cell, i.e., not a degenerate cell; and, assuming the value "m" is at least one, the computer performs a conventional surface interpolation to generate the contour line "H", as indicated by blocks 38, 40, 42 and 44 in the flow diagram of FIG. 9b. However, if the number of cell sides (m) crossed by the specified elevation value H (10.00 meters) is equal to "4", the cell is determined to be a "degenerate cell" (block 46), and the computer then proceeds to generate the proper contour line according to the steps illustrated in blocks 48, 50, 52 and 54 in the flow diagram of FIG. 9b.

Thus, when a degenerate cell is involved, wherein the specified elevation value H (e.g., 10.00 meters) appears as a point on each of the four sides of the cell (m=4), a linear interpolation is performed on the four cell sides, according to box 48 in FIG. 9b. FIG. 10 illustrates how such a linear interpolation is performed for each of the four points, m=1, 2, 3 and 4. In this linear interpolation, "D" is the grid side length and is known; and "d" is the unknown value to be determined. For example, if the specified elevation (H) is 10.00 meters, the other values of the four points "m" can be determined by the linear interpolation steps described in FIG. 10.

Figure 2A:
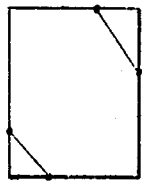
Figure 2B:
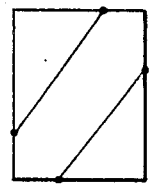
Figure 2C:
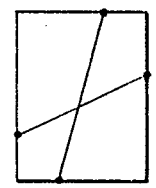
Figure 3:
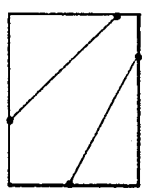
Figure 4:
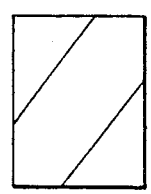
Figure 5:

However, the four points on the four sides of the cell can be connected in different ways, as illustrated in FIGS. 2a, 2b and 2c, only one of which represents a stable and correct connection to produce the proper contour lines. FIG. 2a illustrates the proper contour lines connecting these four points, and blocks 52 and 54 of FIG. 9b, and the flow diagram of FIG. 10 more particularly illustrates the process for generating the proper connecting lines to produce a stable solution to the degenerate cell.

Thus, as indicated in step 50 of FIG. 9b, the four calculated points may be sorted according to increasing values along the X-axis or Y-axis. As shown in FIG. 10, if these values are sorted according to increasing values along the X-axis (block 50a), then the minimum X-axis point is connected to the second minimum X-axis point (block 52a), and the third minimum X-axis point is connected to the maximum X-axis point (block 54a). On the other hand, if the calculated points are sorted according to increasing values along the Y-axis, then the minimum Y-axis point is connected to the second minimum Y-axis point (block 52b), and the third minimum Y-axis point is connected to the maximum Y-axis point (block 54b). Both cases produce the same result, namely a stable solution to the degenerate cell as illustrated in FIG. 2a.

The procedure illustrated in the flow diagram of FIGS. 9a and 9b is then repeated for the next cell, until the contour lines of all the cells have been generated by the computer.

The so-generated contour lines are displayed in display 16 and printed out in printer 18.

While the invention has been described with respect to a preferred embodiment, it will be appreciated that many other variations, modifications and applications of the invention may be made.

What is claimed is:

1. The method of determining contour lines of a three-dimensional surface defined by X-axis, Y-axis and Z-axis coordinates, which contour lines represent a preselected value of the three-dimensional surface along the Z-axis, comprising:

measuring, at regular spacing intervals along the X-axis and Y-axis, the value of the three-dimensional surface along the Z-axis to produce a set of measured points on a grid defining a plurality of four-sides cells each composed of two grid lines along the X-axis and two grid lines along the Y-axis;

interpolating, for each four-sided cell, the measured values of the points along the Z-axis to determine the positions on the grid lines of the respective cell of the interpolated points representing the preselected Z-axis value;

where the cell does not include one such interpolated point on each of the four grid lines, generating contour lines by connecting together the interpolated points; and where the cell includes one such interpolated point on each of the four grid lines, generating contour lines connecting the four interpolated points by sorting the four points according to their values along a selected one of the two grid axes, connecting the point of minimum value along the selected grid axis to the point of second minimum value along the selected grid axis, and connecting the point of third minimum value along the selected grid axis to the point of maximum value along the selected grid axis.

2. The method according to claim 1, wherein the contour lines represent common elevation points in a topographic map.

3. Apparatus for determining contour lines for gridded data defining a four-sided cell composed of two grid lines along the X-axis and two grid lines along the Y-axis, wherein there are two contour lines represented by four data points, one on each of the four grid lines, comprising:

means for sorting the four data points according to their values along a selected one of two grid axes;

means for connecting the point of minimum value along the selected grid axis to the point of second minimum value along the selected grid axis; and means for connecting the point of third minimum value along the selected grid axis to the point of maximum value along the selected grid axis;

said apparatus being one for preparing a topographical map indicating elevation along the Z-axis at a plurality of sample points along the X-axis and Y-axis, said apparatus including means for inputting a common elevation value to be represented by said determined contour lines.

4. The apparatus according to claim 3, wherein said apparatus further includes a probe movable along said X, Y and Z-axes to plot said gridded data; and encoding means for generating electrical signals corresponding to the movement of the probe along each of said axes.

5. The apparatus according to claim 4, wherein said sorting means and said connecting means are included within a computer which is programmed to perform said sorting and connecting functions.

6. The apparatus according to claim 4, wherein said encoding means comprises: a shaft encoder for each of said X, Y and Z-axes outputting digital signals corresponding to the movement of the probe along its respective axis; a direction discriminator for each of said axes, receiving said digital signals and determining the direction of movement of the probe along its respective axis; and an up/down counter for each of said axes registering the values of the movement of the probe along its respective axis.

7. The apparatus according to claim 3, wherein the apparatus further includes a display for displaying said contour lines.

8. The apparatus according to claim 3, wherein the apparatus further includes a printer for printing out said contour lines.

9. Apparatus for determining the contour lines of a three-dimensional surface defined by X-axis, Y-axis and Z-axis coordinates, which contour lines represent a preselected value of the three-dimensional surface along the Z-axis, comprising:

means for measuring, at regular spacing intervals along the Z-axis and Y-axis, the value of the three-dimensional surface along the Z-axis to produce a set of measured points on a grid defining a plurality of four-sides cells each composed of two grid lines along the X-axis and two grid lines along the Y-axis;

means for interpolating, for each four-sided cell, the measured values of the points along the Z-axis to determine the positions of the grid lines of the respective cell of the interpolated points representing the preselected Z-axis value;

means effective, where the cell does not include one such interpolated point on each of th four grid lines, for generating contour lines by connecting the interpolated together; and means effective, where the cell includes one such interpolated point on each of the four grid lines, for generating contour lines connecting the four interpoloated points by sorting the four points according to their values along a selected one of the two grid axis, for connecting the point of minimum value along the selected grid axis to the point of second minimum value along the selected grid axis, and for connecting the point of third minimum value along the selected grid axis to the point of maximum value along the selected grid axis.

10. The apparatus according to claim 1, wherein the apparatus is one for preparing a topographical map indicating elevation along the Z-axis at a plurality of sample points along the X-axis and Y-axis, said apparatus including means for inputting a common elevation value to be represented by said determined contour lines.

* * * * *